United States Patent Office 2,920,733
Patented Jan. 12, 1960

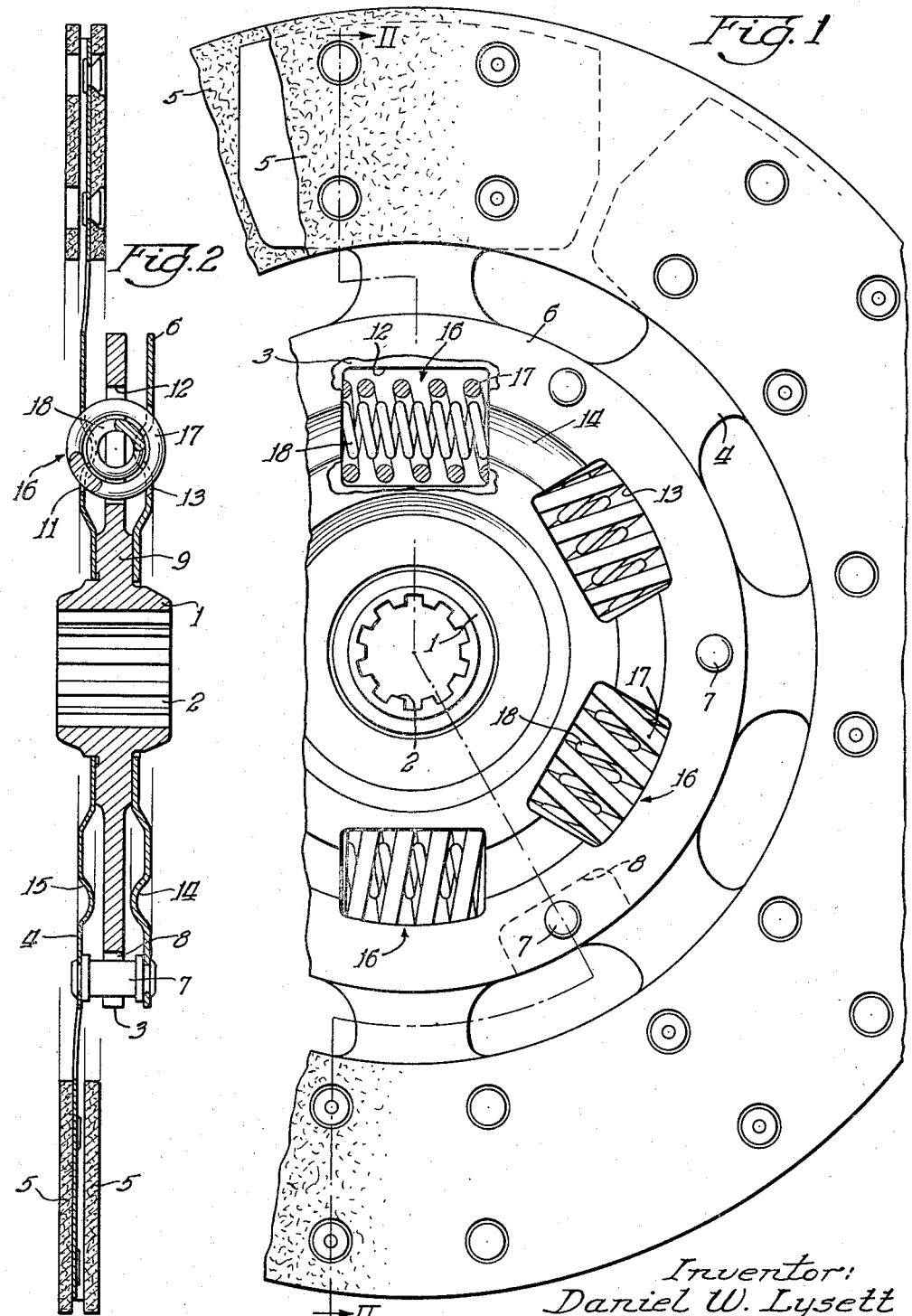

2,920,733

CLUTCH VIBRATION DAMPER ASSEMBLY

Daniel W. Lysett, Utica, Mich., assignor to Borg-Warner Corporation, a corporation of Illinois Application July 24, 1956, Serial No. 599,769

5 Claims. (Cl. 192—107)

This invention relates to a structure for transmitting a rotary power drive operable to dampen vibrations, and is particularly suited for incorporation as the driven plate member in an automotive vehicle clutch.

Clutch mechanisms incorporating vibration dampening means had been used for many years in automotive vehicles, and are frequently of the general type illustrated in the United States Patent No. 2,042,570 to Ernest E. Wemp issued June 2, 1936. Structures of the type illustrated in that Wemp patent provided for a resilient connection between a driving hub and a clutch plate which comprises a plurality of springs respectively disposed between the flange on the driving hub and a sub-combination comprising the clutch plate and a disc washer fixedly connected to the clutch plate. In such constructions, each of the members of the sub-combination and the flange on the driving hub are provided with a plurality of slots, the slots being aligned such that a single spring was received and held within these aligned openings respectively in the clutch disc, the driving flange and the disc washer. Each of these springs was required to be heavy to withstand the maximum torque load to which the mechanism would be subjected to the end that the drive through the device would always be through the springs, as distinguished from a direct drive from the driving flange to the clutch disc directly through the limit stops customarily provided.

It is apparent that the greater horsepower output of modern automotive engines has imposed severely increased loads on the clutch vibration damper mechanism known to the prior art, and has further resulted in greater torsional vibration than experienced in years past. With the single spring type of structure previously described, and as shown in the aforementioned Wemp patent, attempts have been made to accommodate for this increasingly difficult problem by increasing the strength of these single springs. This has resulted in a stronger and heavier spring with fewer coils per inch and increased spring rate. The end result, however, has been the failure to eliminate effectively the disturbing torsional vibration in the drive line of the vehicle in which the clutches are employed due to the fact that this aforementioned increase in spring rate results in less amplitude of movement in the structure for a given imposed load, as will be apparent.

The problem is further complicated by the fact that it is impossible, in clutches with the space limitations required for passenger car usage, to provide a plurality of springs in the manner illustrated in United States Patent 2,127,996 to Havill dated August 23, 1938. This is due to the fact that the space limitations in such passenger car clutches are such as to preclude the usage of both inner and outer apertures to respectively receive springs. In addition, the resulting structure with the inner and outer spring receiving apertures is structurally weakened to such a degree, in these relatively small clutches, as to be unreliable.

It is therefore one object of the present invention to provide a new and improved clutch device with vibration damper structure which will dampen effectively the torsional vibrations in the drive line of the present day automotive vehicle and which are of minimum size and cost.

Another object of the present invention is the provision of a device in accordance with the preceding object in which a plurality of pairs of telescoped springs are provided to transmit power from the driving to the driven member of the assembly.

Another object of the present invention is the provision of a device in accordance with the preceding objects in which the clutch disc and drive washer are respectively formed with integral means which serve to transmit torque to and from the aforementioned pair of springs.

Another object of the present invention is the provision of a device in accordance with the preceding objects in which the clutch disc and drive washer are provided with integral indentations disposed between the spring receiving apertures operative to engage the innermost of the aforementioned pairs of telescoped springs.

Other objects and features of the invention will be readily apparent to those skilled in the art from the specification and appended drawings illustrating certain preferred embodiments in which:

Figure 1 is a partial side elevational view, with portions broken away to facilitate the showing, of a clutch driven member incorporating the principles of the present invention;

Figure 2 is a sectional view along the plane of line II—II of Figure 1.

The clutch driven member, as shown herein, comprises an inner hub 1 having a central splined opening 2 extending therethrough, and carrying an integral, annular radially extending flange 3. The clutch further comprises a spoked driven disc 4 having friction facings 5 secured to the opposite sides of each spoke around its outermost portion and adapted to be packed between driving members, in a manner familiar to those skilled in the art. The disc 4 has a central circular opening therethrough, the sides of which are seated upon a suitable shoulder provided on the hub 1. On the side of the flange 3 opposite the disc 4 there is an annular drive washer 6, the disc 4 and washer 6 being fixedly connected together in predetermined spaced relation by the plurality of rivets 7 which extend through suitable notches 8 in the flange 3, the notches 8 having sufficient circumferential extent to permit relative movement between the flange 3 and the sub-combination of the disc 4 and the drive washer 6. The radially innermost portion 9 of the flange 3 is axially enlarged, and the radially innermost portions of the disc 4 and washer 6 are formed to provide flat, annular surfaces spaced inwardly respectively from the general plane of the disc and washer and disposed in frictional engagement with the portion 9, as illustrated in Figure 2.

The disc 4 is provided with a plurality of circumferentially spaced apertures 11 symmetrically located therein; the flange 3 is formed with a corresponding plurality of apertures 12 of larger radial extent; and the washer 6 is provided with a corresponding number of apertures 13 of substantially the same radial extent as the apertures 11. As best illustrated in Figure 2, the washer 6 has integrally formed therein a plurality of semicircular depressions 14 between each of the openings 13 therein, and the disc 4 has a plurality of semicircular depressions 15 therein respectively disposed between each of the openings 11 therein, the depressions 14 and 15 extending to the associated openings.

As shown in the drawings, the apertures 11, 12, and 13 are aligned, and disposed within each set of openings are spring means, indicated in general by the number 16, which respectively comprise an outer spring 17 and a smaller, inner spring 18. The radial extent of the apertures is such as to hold the spring means 16 in position to permit flexure thereof without rubbing contact with the radial sides defining the openings. The ends of every other one of the outer springs 17 respectively engage the opposite circumferentially spaced sides of their associated openings so as to exert a small amount of initial preload; the other outer springs 17 preferably have a free length of 0.030 to 0.050 inch less than that of the first mentioned outer springs so that their free length is shorter than the length of their respective associated openings. The ends of inner springs 18 respectively engage the circumferential sides of the respective apertures 12. In addition, each end of each inner spring 18 is disposed in contact with a portion of washer 6 forming one of the depressions 14 and with a portion of disc 4 forming one of the depressions 15. It will be seen, therefore, that the depressions 14 and 15 serve as seats for the opposite ends of the springs 18.

The springs 17 and 18 are designed to have a lower spring rate than that of springs currently employed in any single spring clutch vibration damper for automotive use; as a result substantially greater angular movement is possible between the flange 3 and the sub-combination comprising the disc 4 and the washer 6 which very effectively operates to substantially eliminate all torsional vibration in the drive line of the vehicle in which the clutch is employed.

The general operation of this arrangement is readily appreciated. Vibrations communicated to disc 4, as for example from the internal combustion engine, may cause relative movement between the disc 4 (and the washer 6 connected thereto) and the flange 3 by reason of flexing the spring means 16 which eliminate the undesirable vibrations. Driving force from the disc 4 to the hub 1, or vice versa, is at all times through the spring means 16.

It will be seen that the aforedescribed clutch structure is readily assembled, and that the relatively low rate spring means 16 are readily assembled into the position illustrated in the drawings. With this device, the springs 17 and 18 can be adequately designed to provide for greater deflection than was previously the case, thus permitting more amplitude of movement in the vibration damper structure. By thusly providing for greater amplitude of movement between the flange 3 and the disc 4, the device of the present invention effectively eliminates torsional vibrations in the drive line of vehicles having engines of substantially greater horsepower output than heretofore possible. It should also be particularly noted that the advantageous feature inherent in this construction of providing a great latitude of angular movement permits usage of this device with engines of widely different characteristics because this greater permissible angular movement provides significantly greater performance range than was heretofore possible. Despite all of the foregoing advantageous features, the device is compact being no larger than prior art devices, and usable in the restricted space provided in modern passenger car vehicles. It nevertheless is structurally sound and strong—and consequently reliable as is essential—and yet is relatively inexpensive to produce.

In addition, the utilization of a construction having certain of the springs of shorter free length than the length of their associated openings provides for a variable rate of deflection of the damper assembly. More specifically, as initial torque load is applied, all of the springs—except the "loose" springs—start to compress. Therefore until the "loose" springs are compressed, the damper has a certain rate of deflection; as the deflection increases and the "loose" springs become operative, the rate of the deflection increases. As a result, the damper assembly has a low initial rate of deflection and a high final rate of deflection, which is useful in connection with certain drive line conditions called "drift," "coast" or "low torque" disturbances. It will be obvious that although in the preceding description it was pointed out that three of the outer springs are preferably "loose," any number or combination of either the outer or inner springs may be made so as to initially be shorter than the length of their associated openings.

Furthermore, by forming the disc and drive washer to provide flat annular surfaces adjacent the radial inner portions thereof offset so as to frictionally engage the hub flange, this hub flange may be reduced in thickness so as to save material and weight, and the hub is more simple to produce than hubs of the type known to the prior art in which the inner portion of the flange must be thickened to form a shoulder which will contact the disc and drive washer.

While a certain preferred embodiment of the invention has been specifically disclosed, it is understood that the invention is not limited thereto, as many variations will be readily apparent to those skilled in the art and the invention is to be given its broadest possible interpretation within the terms of the following claims.

What is claimed is:

1. In a clutch device, the combination comprising a hub having an integral annular flange projecting radially therefrom, a friction disc supported on said hub at one side of said flange, a drive washer supported on said hub at the other side of said flange; means defining a plurality of aligned groups of apertures in said flange, said friction disc and said drive washer; resilient means disposed within at least one of said aligned groups of apertures adapted to transmit drive from said friction disc to said hub flange and vice versa comprising a first resilient member and a second resilient member disposed within said first resilient member, and means integrally formed in said friction disc and drive washer respectively projecting towards said flange and disposed in engagement with at least one of said resilient members.

2. In a clutch device, the combination comprising a hub having an integral annular flange projecting radially therefrom, a friction disc supported on said hub at one side of said flange, a drive washer supported on said hub at the other side of said flange; means defining a plurality of aligned groups of apertures in said flange, said friction disc and said drive washer; resilient means disposed within at least one of said aligned groups of apertures adapted to transmit drive from said friction disc to said hub flange and vice versa comprising a first resilient member and a second resilient member disposed within said first resilient member, and depression defining means integrally formed in said friction disc and drive washer respectively projecting toward said flange and disposed in engagement with at least one of said resilient members.

3. In a clutch device, the combination comprising a hub having an integral annular flange projecting radially therefrom, means defining a plurality of circumferentially spaced apertures in said flange, a friction disc supported on said hub at one side of said flange, means defining a plurality of circumferentially spaced apertures in said friction disc, a drive washer supported on said hub at the other side of said flange, means defining a plurality of circumferentially spaced apertures in said drive washer, means connecting said friction disc and said drive washer together for common movement; said friction disc, said flange and said drive washer being positioned to effect registration of the apertures therein so that the apertures are disposed in aligned groups of three; spring means in said groups of apertures adapted to transmit drive from said friction disc to said hub flange and vice versa comprising outer coil spring means and inner coil spring means disposed within said outer coil spring means, depression defining means integrally formed in said friction disc extending toward said hub flange and disposed in engagement with said inner coil spring means, and depression defining means integrally formed in said drive washer extending toward said hub flange also disposed in engagement with said inner coil spring means.

4. In a clutch device, the combination comprising a hub having an integral annular flange projecting radially therefrom, means defining a plurality of circumferentially spaced apertures in said flange, a friction disc supported on said hub at one side of said flange, means defining a plurality of circumferentially spaced apertures in said friction disc, a drive washer supported on said hub at the other side of said flange, means defining a plurality of circumferentially spaced apertures in said drive washer, means connecting said friction disc and said drive washer together for common movement; said friction disc, said flange and said drive washer being positioned to effect registration of the apertures therein so that the apertures are disposed in aligned groups of three; spring means in said groups of apertures adapted to transmit drive from said friction disc to said hub flange and vice versa comprising outer coil spring means and inner coil spring means disposed therein, certain of said spring means being constructed and arranged to have an initial free length which is shorter than the length of the apertures in which said certain spring means are disposed, depression defining means integrally formed in said friction disc extending toward said hub flange disposed in engagement with said inner coil spring means, and depression defining means integrally formed in said drive washer extending toward said hub flange also disposed in engagement with said inner coil spring means.

5. The device defined in claim 4 in which said friction disc is provided with a central flat annular portion offset toward said hub disposed in frictional engagement with said flange, and in which said drive washer is provided with a central flat annular portion offset toward said hub disposed in frictional engagement with said flange.

References Cited in the file of this patent

UNITED STATES PATENTS

| | | |
|---|---|---|
| 1,347,907 | Kronfeld | July 27, 1920 |
| 1,861,251 | Wemp | May 31, 1932 |
| 2,248,228 | Goodwin | July 8, 1941 |
| 2,251,128 | Goodwin | July 29, 1941 |
| 2,284,278 | Goodwin | May 26, 1942 |
| 2,314,948 | Nutt | Mar. 30, 1943 |
| 2,613,515 | Crutchley | Oct. 14, 1952 |
| 2,653,692 | Polomski | Sept. 29, 1953 |